US006882722B2

(12) United States Patent
Gilbert et al.

(10) Patent No.: US 6,882,722 B2
(45) Date of Patent: Apr. 19, 2005

(54) VIRTUAL PRIVATE COMMUNICATIONS NETWORK

(75) Inventors: Leroy Edwin Gilbert, Wellington, FL (US); Robert W. Callaghan, Prescott, AZ (US)

(73) Assignee: Siemens Communications, Inc., Boca Raton, FL (US)

( * ) Notice: Subject to any disclaimer, the term of this patent is extended or adjusted under 35 U.S.C. 154(b) by 143 days.

(21) Appl. No.: 10/385,121

(22) Filed: Mar. 10, 2003

(65) Prior Publication Data

US 2004/0179669 A1 Sep. 16, 2004

(51) Int. Cl.[7] .............................................. H04M 3/00
(52) U.S. Cl. ...................................... 379/233; 379/219
(58) Field of Search ........................... 379/219, 220.01, 379/232, 233

(56) References Cited

U.S. PATENT DOCUMENTS

| | | | |
|---|---|---|---|
| 5,943,619 A | 8/1999 | Coyne et al. ................ | 455/433 |
| 6,118,772 A | 9/2000 | Giordano et al. ........... | 370/328 |
| 6,181,935 B1 | 1/2001 | Grossman et al. .......... | 455/433 |
| 6,301,474 B1 | 10/2001 | Hartmaier et al. .......... | 455/417 |
| 6,308,267 B1 | 10/2001 | Gremmelmaier ............ | 713/168 |
| 6,351,464 B1 | 2/2002 | Galvin et al. ................ | 370/356 |
| 6,373,857 B1 | 4/2002 | Ma ............................ | 370/475 |
| 6,445,922 B1 | 9/2002 | Hiller et al. ................. | 455/433 |

FOREIGN PATENT DOCUMENTS

WO    WO 01/35616    5/2001

OTHER PUBLICATIONS

Avaya "No Compromises' Remote Worker Communications" pp. 1–4, Oct. 2001.
Avaya "Solutions for Collaboration—Speed Market Expansion", www1.avaya.com/enterprise/solutions/manufacturing/solutions4.html, 2002.
"Top 10 Benefits of Definity Wireless Business Systems", www1.avaya.com/enterprise/who/docs/DWBS_Top_10.doc, Mar. 7, 2001.
U.S. Appl. No. 10/283,837 "Virtual Private Communications Network" to Nissim Ozery et al. filed Oct. 30, 2002.

Primary Examiner—Creighton Smith

(57) ABSTRACT

A virtual private communications network (VPCN) and method of managing calls on the network. Stations on a private communications network are identified by an unique private network identification (ID) code or dial in direct (DID) number. Remote communications devices (e.g., cell phones, analog phones, etc.) are virtual client devices connected from a public communications network to the private communications network. One or more DID numbers are shared DID numbers, dedicated for the virtual client devices. Calls from the virtual client devices may be placed to network stations by dialing shorthand (e.g., 5 or fewer digits) numbers. Each call has a dedicated DID number temporarily assigned to it for placing the call as an in network call. Once the call reaches its final destination, the shared DID number is released for temporary assignment to other virtual client device calls.

23 Claims, 2 Drawing Sheets

VIRTUAL PRIVATE COMMUNICATIONS NETWORK

BACKGROUND OF THE INVENTION

FIELD OF THE INVENTION

The present invention is related to private communications networks and more particularly, to integrating client devices on a public communication network to a private communications network.

BACKGROUND DESCRIPTION

A private communications network, such as a private voice network, is a full featured local telephone network. A typical private communications network may include, for example, a communications server or private branch exchange (PBX) server linking together wire connected digital phones for a particular enterprise, e.g., phones located in offices on a common campus. The digital phones may be cordless to allow some mobility within a specific local area and sometimes are Internet protocol (IP) based for easy expansion, e.g., simply by connecting extra IP phones. Local users can share both data and voice based information across the private network to improve productivity. Thus, such a private communications network provides user mobility and easy access for telecommuting, as well as cost savings from minimizing use of external lines.

On a typical such private communications network, some phones may have a direct line with a dial in direct (DID) number and others may be accessible as extensions from a main number or switchboard number. The main number may be answered by a voice menu or receptionist. Each phone has its own unique identification on the network, i.e., its own in network phone number. Point to point calling within the network is normally done by dialing an abbreviated number string, one to five digits long. Dialing an out of network number may be a two step process of first dialing out (e.g., dialing 9) and then dialing the number of the party being called. Dialing into the private communications network may entail dialing the main number to get the private network dial tone or voice menu and then, dialing the called party's extension.

Currently, remote private network users (for example, an employee working at home) have limited ability to take advantage of features and functions provided by the communication servers in the private network. Features such as extension dialing and least cost routing through the private network are not available to the remote user. In order for the remote user to connect to the private network and take advantage of such features, normally, there are three options:

(1) The remote user can dial a remote access number, to connect to the private network, dial additional digits to identify her/himself and then, dial more digits to complete the call or take advantage of private network features. This is typically called "multi-stage dialing."

(2) The remote user can have a dedicated telephone line connected to the private network. This is typically called a remote subscriber line. This eliminates the need for multi-stage dialing, but can be relatively expensive.

(3) The remote user can connect over a high data speed link (e.g., over a high speed broadband connection such as a Digital Subscriber Line (DSL) or a cable modem line) to the communications server using a personal computer (PC) to seamlessly communicate with other connected users. For access to all of the communications server features, a broadband connection must be available to permit high quality voice (VoIP) and necessary feature control signaling to share the same connection from the remote PC. A standard modem data connection is not fast enough for this purpose.

Unfortunately, dedicated lines are expensive and broadband is far from being universally available and seldom available to travelers. When broadband is not available, the only data access to the communications server is with a modem over a public switching telephone network (PSTN) and remote users still cannot access all of the private communications network features. Likewise, cell phone connections to the private communications network are no different than any other incoming call, e.g., someone calling on a land line connected to the plain old telephone system (POTS). The caller must resort to multi-stage dialing to access the features of the private network. Either way, remote users have little access, if any, to any of the private communications network features without a high speed digital connection available.

Thus, there is a need to extend private communications networks beyond the physical range of wire connected devices, especially to distant users connecting through a public network connection and especially, to make private communications network features available to distant users.

SUMMARY OF THE INVENTION

It is a purpose of the invention to extend the range of private communications networks;

It is another purpose of the invention to simplify connecting to private communications network users by remote or distantly located users;

It is yet another purpose of the invention to simplify connecting to remote or distantly located users by private communications network users.

It is yet another purpose of the invention to provide remote or distantly located users with all private communications network features without the need for multi-stage dialing.

The present invention relates to a virtual private communications network (VPCN) and method of managing calls on the network. Stations on a private communications network are identified by an unique private network identification (ID) code or dial in direct (DID) number. Remote communications devices (e.g., cell phones, analog phones, etc.) are virtual client devices connected from a public communications network to the private communications network. One or more DID numbers are shared DID numbers, dedicated for the use of the virtual client devices. Calls from the virtual client devices may be placed to network stations by dialing shorthand (e.g., 5 or fewer digits) numbers. Each call has a dedicated DID number temporarily assigned to it for placing the call as an in network call. Once the call reaches its final destination, the shared DID number is released for temporary assignment to other virtual client device calls.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
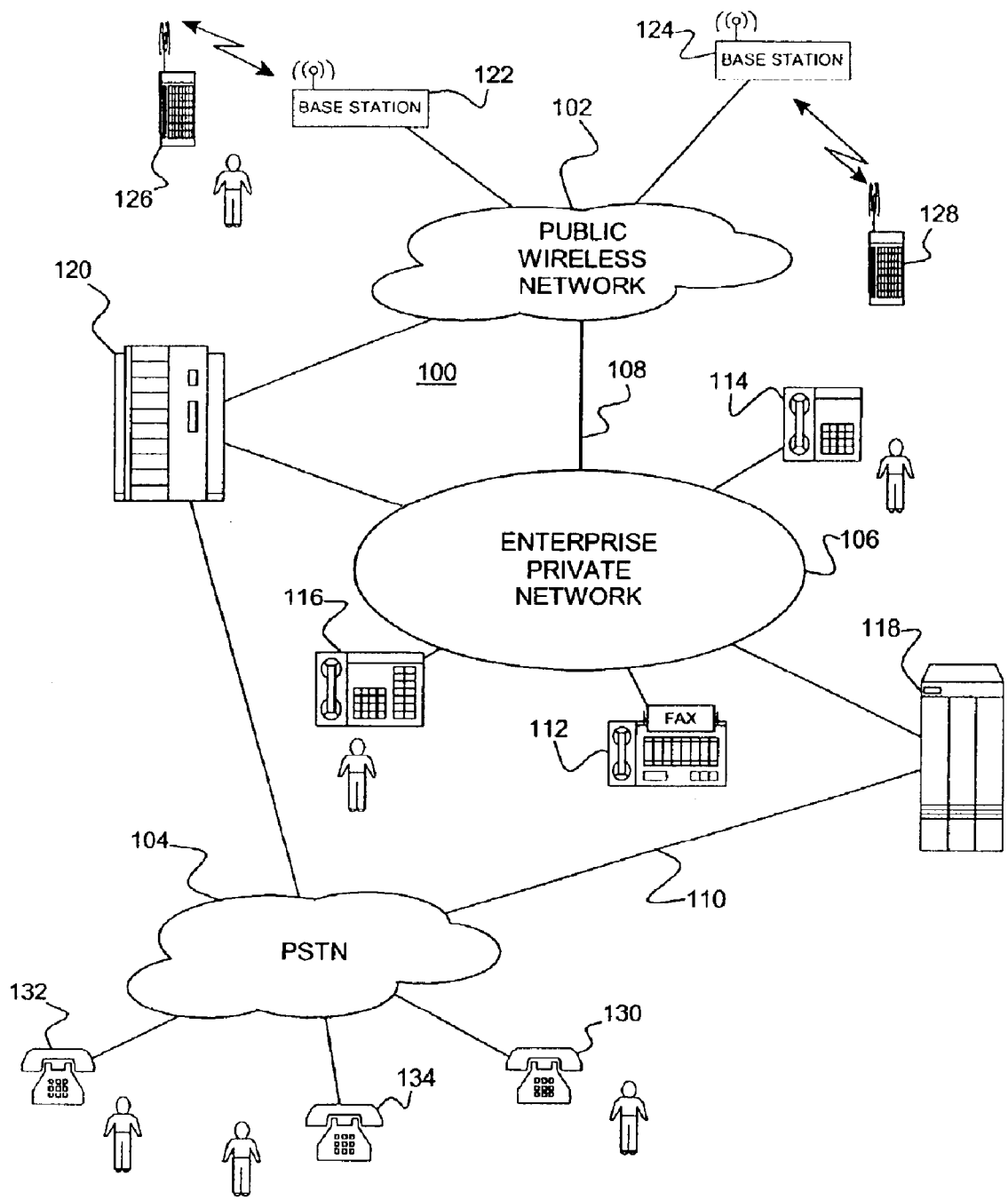
FIG. 1 shows an example of a preferred embodiment virtual private communications network.

Turning now to the drawings and more particularly, FIG. 1, an example of a preferred embodiment virtual private communications network (VPCN) 100 is shown. VPCN client users connect from a public wireless network (PWN) 102 or from a public switched telephone network (PSTN) 104 to an Enterprise Private Network (EPN) 106 over standard telephony trunk interfaces 108, 110, respectively. The connections 108, 110 between public network (102, 104 collectively) and EPN 106, each may be an integrated services digital network (ISDN) line, for example.

The EPN 106 includes one or more digital communications devices at individual EPN stations 112, 114, 116. Also, the EPN 106 includes one or more communications network servers 118, e.g., a private branch exchange (PBX), managing private communications over the EPN 106 and a mobility server 120, preferably colocated with the PBX. Remotely located base stations 122, 124 connect VPCN wireless client devices 126, 128, e.g., cell phones, to the public wireless network 102. VPCN clients 130, 132 are normal telephones that can connect to the EPN 106 through PSTN 104. The mobility server 120 on the EPN 106 contains contact information for VPCN client devices 126, 128, 130, 132. In particular, PSTN 104 may be the plain old telephone service (POTS) and VPCN clients 130, 132 may be analog telephones connected to analog trunks. The communications server 118 may be connected to the PSTN 104 for communications with non-VPCN clients 134. The mobility server 120 has control data links 136 to each of the PWN 102 and the PSTN 104.

State of the art public communications networks (e.g., mobile networks 102 and wire-line networks 104) include feature control overlays and are known in the art as Intelligent Networks (IN) or Advanced Intelligent Networks (AIN). Each IN and AIN includes feature servers in the public communications networks 102, 104 to control access, call routing and other features for connected telephones. An industry development group known as Parlay (See, e.g., www.parlay.org) has extended the applicability of both IN and AIN feature control overlays to private enterprise services e.g., EPN 106. Thus, the control data links 136 from mobility server 136 to the PWN 102 and the PSTN 104 may be Parlay links between the EPN 106 and the public networks 102, 104.

As with a typical state of the art private voice network, each EPN station 112, 114, 116 has an individual EPN number, specifically identifying the respective EPN station 112, 114, 116, i.e., an extension number. Each EPN station 112, 114, 116 also may be identified in network by a publicly dialable DID number. Additionally, however, in a preferred embodiment VPCN 100 a group of shared DID numbers are set aside for temporary assignment on an as needed basis to incoming calls from VPCN client devices 126, 128, 130, 132, which are virtual stations of the EPN 106. Thus, calls from client devices 126, 128, 130, 132 on the public network (collectively 102, 104) are completed to each particular EPN station 112, 114, 116 as if placed from another EPN station, i.e., by dialing the abbreviated number, and all virtual stations 126, 128, 130, 132 have access to all EPN 106 features. So, just as if placed from any of EPN stations 112, 114, 116, all calls from VPCN client devices 126, 128, 130, 132 connect to other EPN stations 112, 114, 116, 126, 128, 130, 132 in a single dialing step, even calls originating in analog trunks PSTN 104.

Optionally, for example, a preferred mobility server 120 may define a special digit sequence as an "escape sequence," e.g., \*\*. When the VCPN client (e.g. station 132) prefixes the dialed number with this sequence (e.g. \*\*923-1779) the mobility server 120 may recognize from this prefix that the caller does not want to use the EPN or the EPN numbering plan. As a result, the mobility server 120 may simply delete the prefix code and instruct the PSTN to route the call directly to destination 923-1779, without transiting the EPN first.

In another example, a preferred mobility server 120 provides a preconfigured time-of-day and day-of-week schedule for logging the VPCN client onto (or off of) the EPN. When the client is "logged on" to the EPN, all calls are routed through the EPN as described hereinabove. When the client is "logged off" of the EPN, the remote telephone behaves as a normal PSTN telephone (no intervention by the mobility server). In yet another example, a preferred mobility server 120 is configured with special access codes to turn on and turn off the special EPN routing functions. This example may be used whenever the previous two examples are not adequate. Furthermore, although described hereinabove with reference to Parlay protocol as a control mechanism between PSTN and mobility server, this is for example only and not intended as a limitation. Other appropriate control mechanisms may be used such as, for example, a direct IP low-speed connection from an intelligent wireless telephone to the mobility server without the PARLAY interface.

Figure 2:
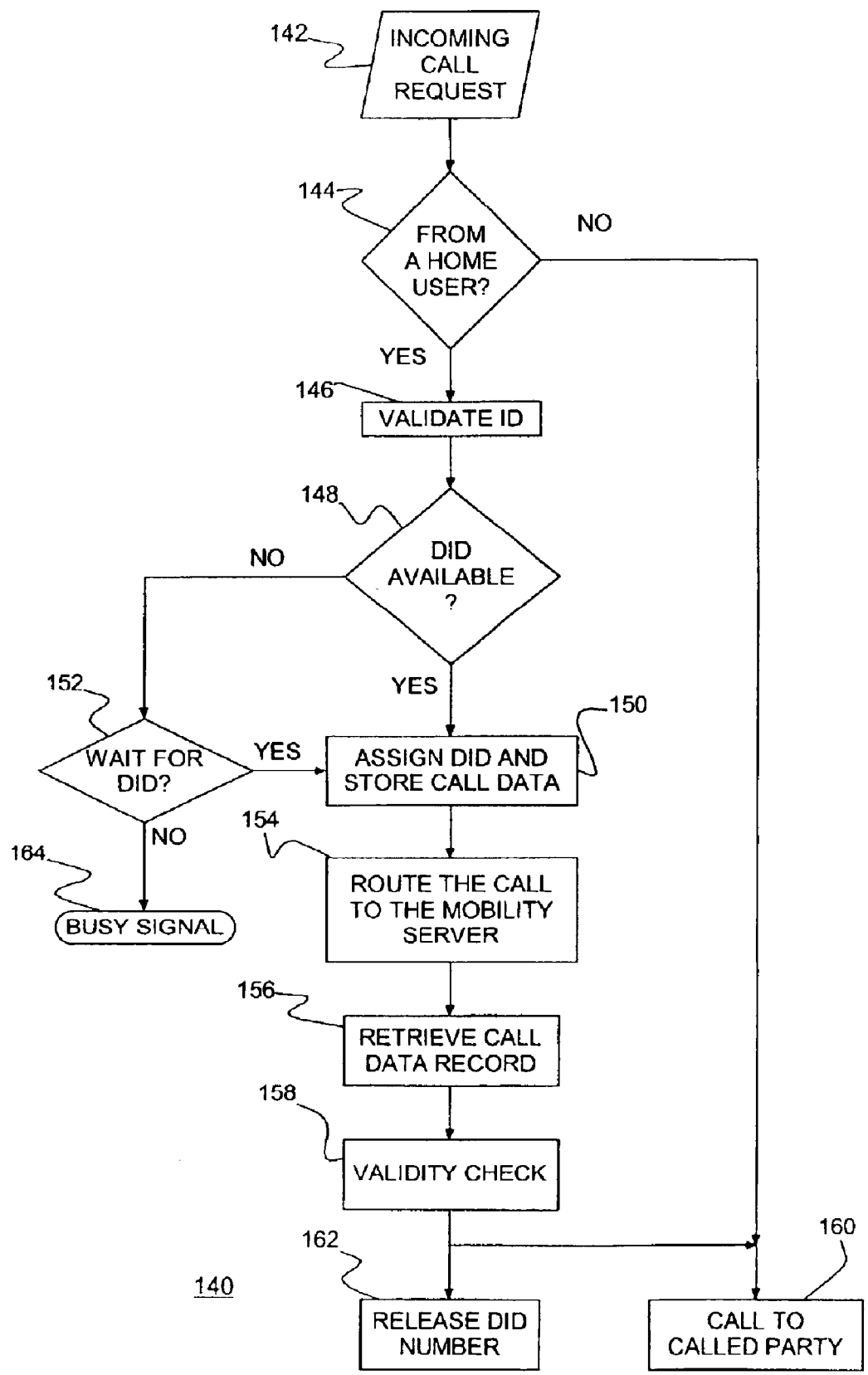
FIG. 2 shows an example of a method of managing VPCN calls between EPN stations through a small group of DID numbers dedicated for single step dialing.

FIG. 2 shows an example 140 of a method of managing VPCN calls between EPN stations through a small group of shared DID numbers dedicated for single step dialing according to a preferred embodiment of the present invention with reference to the example of FIG. 1. Each virtual client device 126, 128, 130, 132 is previously identified to a respective public network (102 or 104) service provider, e.g., through a service agreement. All of these shared DID numbers are routed through the PBX (communications server 118) to the mobility server 120. Since each shared DID number can typically be reused after each incoming call is extended to its destination, typically only a few seconds, only small number of shared DID numbers are required. For many systems, where few virtual stations are used and traffic on those few stations is relatively light, a single additional dedicated shared DID number may be sufficient. This DID number and DID trunk(s) associated with the number may be part of a standard DID trunk block used for other network purposes, e.g., traditional inbound calling.

So, in step 142 a remote or home user (e.g., at virtual client devices 126, 128, 130, 132) places a call to the VPCN 100, e.g., by dialing the extension number of a VPCN subscriber. In step 144 the respective public network service provider detects that the call is from the remote user at a respective one of virtual client devices 126, 128, 130, 132 and forwards a call notification over digital connection 136 to the mobility server 120 for analysis. In step 146 the mobility server 120 validates the incoming call is from the remote user. In step 148 if one of the shared DID numbers is available, then in step 150 the mobility server 120 assigns one to the call. Otherwise, in step optional 152 the mobility server 120 may wait until a shared DID number becomes available and, once one is available, in step 150 assigns the available number. When in step 150 the mobility server 120 assigns one of the shared DID numbers, it also stores call identification information, e.g., the identity of the caller and the dialed digits. Then, using the assigned DID number in step 154 the public network service provider routes the call to the mobility server 120 using the assigned DID number. When the call arrives at the mobility server 120 in step 156 the mobility server 120 recognizes the call by the shared DID number and retrieves the stored call identification information. After validation in step 158, the mobility server 120 extends the call to the called station in step 160. Once the call is extended, in step 162 the mobility server 120 releases the shared DID number and again, it is available for the next incoming call. If in step 144 the call is not from a VPCN client the mobility server 120 instructs the originating network to handle the call normally, based on the original dialed digits. If, in step 148 a shared DID number is not available and in step 152 waiting is not selected; then, typically in step 164 the mobility server 120 instructs the originating network to give a busy signal.

So, for example, a small group of (e.g., 5) shared DID numbers (e.g., 561-923-1770 through 1774) are assigned to the VPCN, i.e., for single step dialing. When the call request (step 142) from the remote user is detected (step 144) by the public network, the respective public network (102 or 104) forwards the call notification to the mobility server 120 for analysis. The mobility server 120 validates (step 146) the caller ID (e.g., UA) and, then assigns (step 148) one of the shared DID numbers (for example 561-923-1771) to the call. The mobility server 120 passes this assigned number back to the public network. The mobility server 120 stores/remembers (step 150) information regarding the call, such as for example, the caller ID (UA), the original dialed number (ext. 5000), and the assigned DID number (561-923-1771). If all shared DID numbers are in use (step 148), the mobility server 120 can elect to delay (step 152) the response until a shared DID number becomes available.

Next, the respective public network (102, 104) routes the call (step 154) to the mobility server using the assigned DID number. Shortly thereafter, e.g., 2 seconds, the user call arrives at the mobility server 120. The mobility server 120 recognizes the call by the shared DID number used. The mobility server 120 can detect, for example, that the last digits for the incoming call are 31771. Using this number, the mobility server 120 retrieves (step 156) the data record for the call, which contains the caller ID (e.g., UA) and the original dialed number (5000). If the public network delivers a caller ID to the PBX and mobility server, then the caller ID can be compared to the stored record, as an additional validity check. If the caller ID is not supplied by the public network, e.g., the call is from an analog trunk, the mobility server can elect to route the call based on the shared DID number validation alone. So, the mobility server 120 extends the call (step 160) to its final destination (5000) after validation (step 158). As soon as the call is extended, the shared DID number (561-923-1771) is free to be used again (step 162), for a new call request from a different user. Preferably, the mobility server 120 extends the call to the ultimate destination in such a way that the mobility server 120 can continue to monitor and control the call, providing the same in-call feature services that are available to telephones directly connected to the EPN/PBX.

Thus, the present invention extends private communications networks beyond the physical range of state of the art private communications networks to public network phone users, even when caller ID is not supported, e.g., analog trunks between the public network and the PBX while maintaining an economical use of DID trunk facilities. A flexible virtual private network is formed of public-network devices and private-network devices (telephones) using the Intelligent Network Infrastructure and a publicly-known (e.g., Parlay) interface at a reduced cost. Effectively, Public network stations (both on public wireless networks and on PSTNs) have virtual connections to the private communications network and so, appear identical to other network devices. Thus, whether a phone with a virtual connection is across the room, across the street, across the city or across the country, the public network phone connects to other VPCN clients by dialing the short EPN network number and, likewise, is contacted by other VPCN clients by dialing the cell phone's short EPN network number.

While the invention has been described in terms of preferred embodiments, those skilled in the art will recognize that the invention can be practiced with modification within the spirit and scope of the appended claims.

What is claimed is:

1. A virtual private communications network comprising:
    a private communications network including a plurality of stations each identified by an unique private network identification (ID) code;
    a plurality of communications devices, ones of said plurality of communications devices being a corresponding station identified by a corresponding unique private network ID code and being contacted by selecting a respective said ID code;
    at least one of said plurality of communications devices being a virtual client device connected to a public communications network; and
    at least one of said plurality of unique private network ID codes being a shared ID temporarily assignable to each said virtual client device, selecting said respective ID code for other ones of said plurality of communications devices connects said each virtual client device to said other ones as an in network connection.

2. A virtual private communications network as in claim 1, wherein at least one said virtual client device is an analog telephone connected to an analog trunk on said public communications network.

3. A virtual private communications network as in claim 1, wherein a group of shared IDs are temporarily assignable to a corresponding number of virtual client devices, wherein said group of shared IDs includes fewer shared IDs than virtual client devices in said plurality of communications devices.

4. A virtual private communications network as in claim 1, wherein said unique private network ID codes are dial in direct (DID) numbers.

5. A virtual private communications network as in claim 1 further comprising a data link from said public communications network to said private communications network.

6. A virtual private communications network as in claim 1 further comprising:
    a communications network server managing said private communications network; and
    a mobility server managing a communications between each said virtual client device and said communications network server.

7. A virtual private communications network as in claim 1 wherein at least one said virtual client device is a wireless device.

8. A virtual private communications network as in claim 7 wherein at least one said wireless device is a cell phone.

9. A virtual private communications network comprising:
    a private communications network including a plurality of stations each identified by an unique private network identification (ID) code;

a plurality of communications devices, ones of said plurality of communications devices being a corresponding station identified by a corresponding unique private network ID code and being contacted by selecting a respective said ID code;

at least one of said plurality of communications devices being a virtual client device connected to a public communications network;

a communications network server managing said private communications network;

at least one of said plurality of unique private network ID codes being a shared ID temporarily assignable to each said virtual client device, selecting said respective ID code for other ones of said plurality of communications devices connects said each virtual client device to said other ones as an in network connection; and a mobility server assigning said unique private network ID codes to said each virtual client device upon receipt of a call request to another said respective ID code.

10. A virtual private communications network as in claim 9, wherein said communications server is a private branch exchange (PBX) server.

11. A virtual private communications network as in claim 9, wherein at least one said virtual client device is an analog telephone connected to an analog trunk on said public communications network.

12. A virtual private communications network as in claim 9, wherein a group of shared IDs are identified as temporarily assignable, said virtual client device is one of a plurality of virtual client devices, said mobility manager assigning one of said group to one said virtual client device upon receipt of a call request from said one virtual client device.

13. A virtual private communications network as in claim 9, wherein when one said shared ID is unavailable, said mobility server waits to assign a next available said shared ID to said one virtual client device.

14. A virtual private communications network as in claim 9, wherein each said unique private network ID code is a dial in direct (DID) number.

15. A virtual private communications network as in claim 9 further comprising a digital link between said public communications network and said private communications network.

16. A method of managing private network calls, said method comprising the steps of:

a) checking whether an incoming call originates from a virtual client device;

b) attaching a shared network identification code to each said call determined to originate from a virtual client device;

c) routing each virtual client device originated call with an attached said shared network identification code to a mobility server;

d) checking calls routed to said mobility server to determine whether each originated from one said virtual client device;

e) forwarding each routed call to an identified private network station; and f) releasing said shared network identification code attached to said routed call.

17. A method of managing private network calls as in claim 16, wherein public service provider client calls are checked in the checking step (a) by the public service provider and any calls from virtual client devices are identified.

18. A method of managing private network calls as in claim 16, wherein said shared network identification code attached in attaching step (b) is a single dial in direct (DID) number.

19. A method of managing private network calls as in claim 16, wherein said shared network identification code attached in attaching step (b) is selected from a group of shared dial in direct (DID) numbers, for each identified said incoming call said mobility server selecting an available shared DID number from said group and attaching the selected said shared DID number to said incoming call.

20. A method of managing private network calls as in claim 19, wherein if all shared DID numbers are attached to incoming calls, said attaching step (b) further comprises waiting for an attached one of said shared DID numbers to be released.

21. A method of managing private network calls as in claim 16, wherein the attaching step (b) further comprises storing call related information for each call from a virtual client device.

22. A method of managing private network calls as in claim 21, wherein stored said call related information comprises a caller identification, an original dialed number and an assigned DID number.

23. A method of managing private network calls as in claim 22, wherein the step (d) of checking routed calls to said mobility server further comprises retrieving said stored call related information for each said call determined from a virtual client device comprises.

* * * * *